US008948590B2

(12) United States Patent
Vojtěch et al.

(10) Patent No.: US 8,948,590 B2
(45) Date of Patent: Feb. 3, 2015

(54) MODULAR KIT OF DEVICES FOR VARIABLE DISTRIBUTION, MIXING AND MONITORING OF OPTICAL SIGNALS IN THE INTERNET AND OTHER NETWORKS

(75) Inventors: Josef Vojtěch, Prague (CZ); Miloslav Hůla, Křivoklát (CZ); Miroslav Karasek, Kolín (CZ); Stanislav Šíma, Sázava (CZ); Jan Radil, Prague (CZ)

(73) Assignee: Cesnet Zajmove Sdruzeni Pravnickych Osob, Prague (CZ)

( * ) Notice: Subject to any disclaimer, the term of this patent is extended or adjusted under 35 U.S.C. 154(b) by 163 days.

(21) Appl. No.: 13/818,215

(22) PCT Filed: Aug. 30, 2011

(86) PCT No.: PCT/CZ2011/000084

§ 371 (c)(1),
(2), (4) Date: Feb. 21, 2013

(87) PCT Pub. No.: WO2012/028118

PCT Pub. Date: Mar. 8, 2012

(65) Prior Publication Data

US 2013/0148960 A1 Jun. 13, 2013

(30) Foreign Application Priority Data

Sep. 2, 2010 (CZ) .............................. PV2010-657

(51) Int. Cl.
*H04B 17/00* (2006.01)
*H04B 10/08* (2006.01)
(Continued)

(52) U.S. Cl.
CPC ........... *H04B 10/07* (2013.01); *H04Q 11/0005* (2013.01); *H04Q 2011/0015* (2013.01);
(Continued)

(58) Field of Classification Search
CPC ............... H04B 10/07; H04Q 11/0005; H04Q 2011/0015

USPC ......... 398/25, 45, 66, 49; 385/16, 15, 24, 37, 385/56
See application file for complete search history.

(56) References Cited

U.S. PATENT DOCUMENTS 5,091,983 A * 2/1992 Lukosz ........................... 385/13
5,291,505 A 3/1994 Nielsen
(Continued)

FOREIGN PATENT DOCUMENTS

CZ        300 811 B6    8/2009
WO    WO 01/86998 A1   11/2001
WO    WO 2009/071036 A2   6/2009

OTHER PUBLICATIONS

International Search Report (PCT/ISA/210) issued on Feb. 2, 2012, by the European Patent Office as the International Searching Authority for International Application No. PCT/CZ2011/000084.
(Continued)

*Primary Examiner* — Ken Vanderpuye
*Assistant Examiner* — Abbas H Alagheband
(74) *Attorney, Agent, or Firm* — Buchanan Ingersoll & Rooney PC

(57) ABSTRACT

Modular kit of devices for variable distribution, mixing and monitoring of optical signals in the Internet and other networks is formed by an optical module interconnected with a control electronic module of the electronic system with two redundant power supply sources, which is subsequently interconnected with the communication computer module equipped with the user communication interface and the machine communication interface. Optical module has N optical inputs and M optical outputs where N and M are non-zero natural numbers, and in total the optical module contains N×M of 2×2 type Mach-Zender interferometer optical switching elements. Each of them has two optical inputs, two optical outputs and one electric input. Optical switching elements are mutually interconnected in a grid. Control electronic module is formed by N×M pulse-width modulators connected via an interface module to the communication computer module and to the power supply distribution block.

7 Claims, 1 Drawing Sheet

(51) Int. Cl.
*H04J 14/00* (2006.01)
*G02B 6/26* (2006.01)
*G02B 6/28* (2006.01)
*G02B 6/34* (2006.01)
*G02B 6/38* (2006.01)
*H04B 10/07* (2013.01)
*H04Q 11/00* (2006.01)

(52) U.S. Cl.
CPC .............. *H04Q2011/0037* (2013.01); *H04Q 2011/0039* (2013.01); *H04Q 2011/0047* (2013.01); *H04Q 2011/0052* (2013.01); *H04Q 2011/0083* (2013.01); *H04Q 2213/1301* (2013.01)
USPC ............... 398/25; 398/45; 398/66; 398/49; 385/16; 385/15; 385/24; 385/37; 385/56

(56) References Cited

U.S. PATENT DOCUMENTS

| | | | |
|---|---|---|---|
| 5,920,412 A | 7/1999 | Chang | |
| 6,229,932 B1* | 5/2001 | Fukashiro et al. | 385/16 |
| 6,292,597 B1* | 9/2001 | Lagali et al. | 385/1 |
| 6,393,173 B1* | 5/2002 | Doerr et al. | 385/16 |
| 6,543,286 B2* | 4/2003 | Garverick et al. | 73/514.18 |
| 6,571,027 B2* | 5/2003 | Cooper et al. | 385/12 |
| 6,705,165 B2* | 3/2004 | Garverick et al. | 73/514.18 |
| 6,728,445 B2* | 4/2004 | Blomquist et al. | 385/37 |
| 6,924,894 B2* | 8/2005 | Hoult et al. | 356/477 |
| 6,961,257 B2* | 11/2005 | Garverick et al. | 365/49.1 |
| 7,263,288 B1* | 8/2007 | Islam | 398/49 |
| 7,428,054 B2* | 9/2008 | Yu et al. | 356/480 |
| 7,693,354 B2* | 4/2010 | Carothers | 385/1 |
| 8,159,143 B2* | 4/2012 | Lee et al. | 315/291 |
| 8,582,967 B2* | 11/2013 | Vojtech et al. | 398/45 |
| 2002/0015552 A1* | 2/2002 | Link et al. | 385/24 |
| 2002/0025097 A1* | 2/2002 | Cooper et al. | 385/12 |
| 2002/0071627 A1* | 6/2002 | Smith et al. | 385/15 |
| 2002/0109878 A1 | 8/2002 | Qiao | |
| 2002/0159684 A1* | 10/2002 | Sun et al. | 385/20 |
| 2003/0140698 A1* | 7/2003 | Garverick et al. | 73/514.18 |
| 2004/0018016 A1 | 1/2004 | O'Mahony et al. | |
| 2004/0071383 A1* | 4/2004 | Balachandran et al. | 385/12 |
| 2004/0071390 A1* | 4/2004 | Horst | 385/17 |
| 2004/0174757 A1* | 9/2004 | Garverick et al. | 365/200 |
| 2005/0146712 A1* | 7/2005 | Kopelovitz et al. | 356/73.1 |
| 2005/0163430 A1* | 7/2005 | Noirie et al. | 385/56 |
| 2005/0180750 A1* | 8/2005 | Wada et al. | 398/49 |
| 2005/0213972 A1* | 9/2005 | Aoki et al. | 398/49 |
| 2006/0133721 A1* | 6/2006 | Kopelovitz et al. | 385/16 |
| 2009/0103861 A1* | 4/2009 | Presley et al. | 385/16 |
| 2009/0304328 A1* | 12/2009 | Presley et al. | 385/16 |
| 2010/0045649 A1* | 2/2010 | Boom et al. | 345/211 |
| 2010/0150495 A1* | 6/2010 | Kawanishi et al. | 385/3 |
| 2010/0266240 A1* | 10/2010 | Krishnamoorthy et al. | 385/37 |
| 2010/0310254 A1* | 12/2010 | Vojtech et al. | 398/45 |
| 2012/0025910 A1* | 2/2012 | Jiang et al. | 330/251 |
| 2012/0170933 A1* | 7/2012 | Doerr et al. | 398/48 |

OTHER PUBLICATIONS

Written Opinion (PCT/ISA/237) issued on Feb. 2, 2012, by the European Patent Office as the International Searching Authority for International Application No. PCT/CZ2011/000084.
Czech Republic Search Report for PV 2010-657 dated May 2, 2011.
Chen Yuan-Yuan et al., "Thermo-optic SOI Waveguide Switch Matrix", Proceedings of the SPIE—the International Society for Optical Engineering, 2009, pp. 1-7, vol. 7381.
G. Papadimitriou et al., "Optical Switching: Switch Fabrics, Techniques, and Architectures", Journal of Lightwave Technology, IEEE Service Center, Feb. 1, 2003, pp. 384-405, vol. 21, No. 2.
Z. Wang et al., "Rearrangeable nonblocking thermo-optic 4 ×5 switching matrix in silicon-on-insulator", IEEE Proceedings: Optoelectronics, Institution of Electrical Engineers, Jun. 3, 2005, pp. 160-162, vol. 152, No. 3.

* cited by examiner

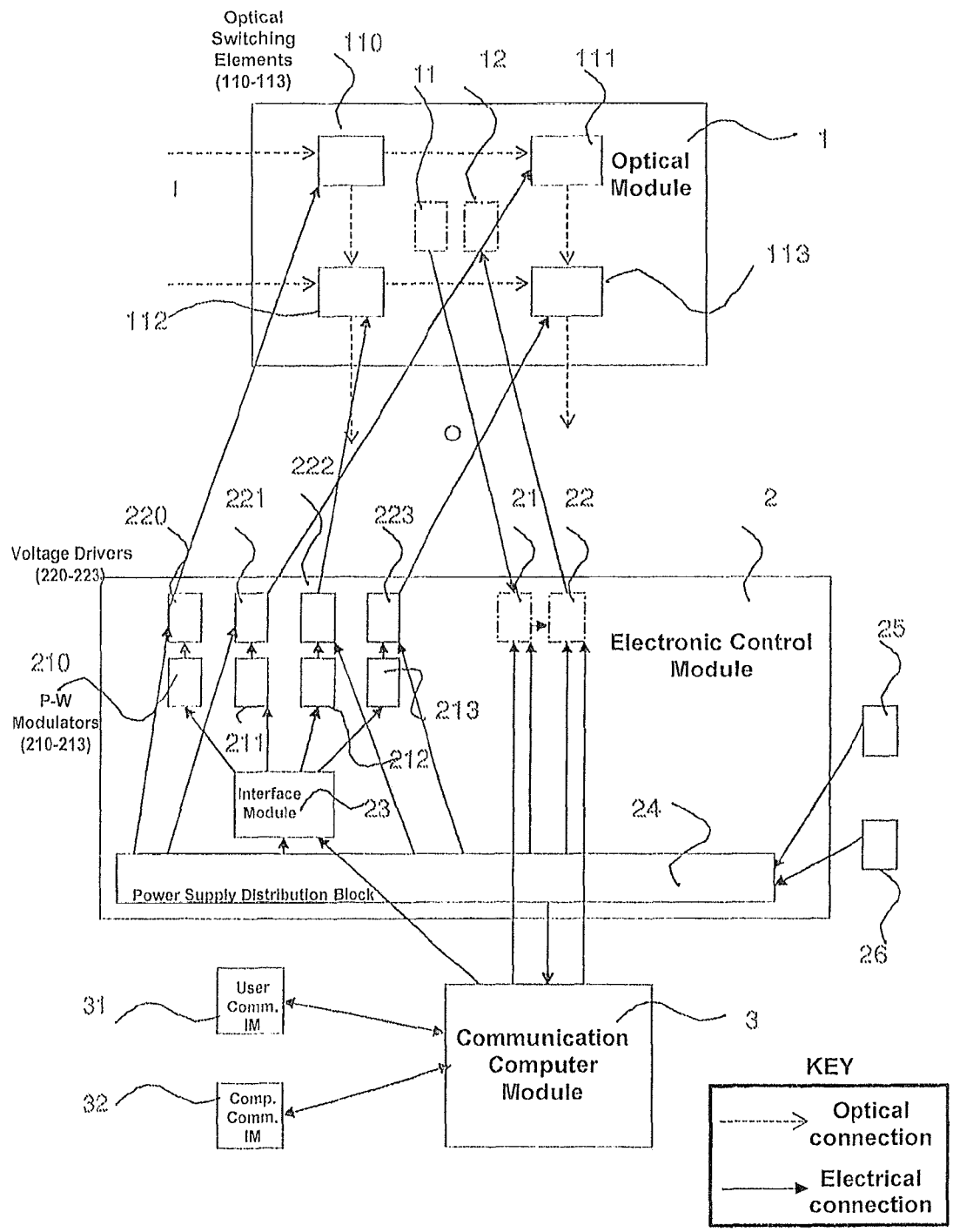

MODULAR KIT OF DEVICES FOR VARIABLE DISTRIBUTION, MIXING AND MONITORING OF OPTICAL SIGNALS IN THE INTERNET AND OTHER NETWORKS

BACKGROUND OF THE INVENTION

Presented solution deals with a modular kit of devices for variable distribution, mixing and monitoring of optical signals in the Internet and other networks and belongs to the area of telecommunication technology and services.

DESCRIPTION OF PRIOR ART

For distribution of high-speed data streams, especially multimedia ones, current networks still use the traditional approach where data signals are converted from optical domain to electric domain, in which they are replicated and then they are re-converted to the optical domain. In the electric domain, the data are transformed into packets and the replication is achieved by copying such packets in memory. However, this replication in electric domain is rather demanding, it puts devices under considerable load resulting in rather limited volume of replicated streams as well as number of replications. On the contrary, replication in the optical domain is relatively simple but all solutions known so far achieved the condition when the insertion loss of the device, it means the replicator, corresponded to the insertion loss for maximum achievable splitting.

Monitoring of multiple optical signals typically uses directional couplers with fixed coupling ratio followed by an optical switch, which allows automatic measurement of multiple optical parameters by means of one or a few measuring devices. Directional couplers with fixed coupling ratios are also typically used for optical signals mixing. Variable mixing is then offered by elements operating on a wavelength basis where the wavelengths of signals being processed are fixed.

Simple switching of optical signals at present is most commonly provided by fibre switches operating on micromechanical principle. This technology is well mastered, however, given its principle; it features life time limited by the number of switching actions, slower switching because a mechanical action is involved, and the devices are prone to interference by vibrations.

Switches operating on non-mechanical principle exploit thermal dependence of refraction index in polymer materials where controlled heating influences the path of light in Y and X branches. Other switchers based on non-mechanical principle can also operate on the principle of Mach-Zender interferometer (MZI) where the change of phase in one interferometer branch can determine to which output the input signal will be routed. Phase changes are achieved also thermally or by means of electric voltage in $LiNbO_3$-type materials.

In overall majority, the complete switch is realized by interconnection of basic simple switching elements (1 input and 2 outputs or 2 inputs and 2 outputs) into a switching network, e.g. butterfly- or Benes-type network. In the past, these networks were intensively studied and they allow switch any of the inputs to any of the outputs with minimum allocation of switching elements. Switching elements are almost always binary controlled and therefore in a given moment the input signal can be switched only to just one output. Switching networks based on this design are not suitable for high-speed signals distribution because they do not allow signal distribution from one input to multiple outputs.

Solutions consisting of optical block, electronic block and communication computer are known where the optical module is formed by a grid of switching elements. However, these solutions use binary-type switching elements and therefore they allow only switching of complete signals. The signals in this case cannot be distributed into multiple outputs or mixed from multiple inputs.

There are also solutions for distribution or collection of signal samples using switching networks, which combine splitting and switching elements, e.g. as described in patent CZ 300811. These splitting elements however achieve only fixed splitting ratios and so it is not possible to change the splitting/mixing ratios and thus to flexibly respond to changed needs of the optical signals distribution or monitoring.

SUMMARY OF THE INVENTION

Disadvantages of the device with fixed splitting/mixing ratio mentioned above are solved by the modular kit of devices for variable distribution, mixing and monitoring of optical signals in the Internet and other networks according to the presented solution. The kit is formed by an optical module interconnected with control electronic module with two redundant power supply sources. Control electronic module is interconnected with the communication computer module, which is equipped with a user communication interface and a machine communication interface. Control electronic module contains the power supply part distributing necessary power supply voltage also for the communication computer.

Principle of the new solution is the fact that the optical module has N optical inputs and M optical outputs, where N and M are non-zero natural numbers, and in total the optical module contains N×M of optical switching elements 2×2, each with two optical inputs and two optical outputs, and one electric input, based on the MZI principle. These optical switching elements exploit the transformation of electric signal to local warming, which influences the refraction index and thus it causes changes of phase. Optical switching elements are mutually interconnected in a grid. Each MZI optical switching element has connection for one electric input controlling the delay of time it takes for the optical signal to travel through one MZI branch; it means that the optical module has N×M of electric inputs controlling individual switching elements. Control electronic module is formed by N×M pulse-width modulators, in short PWM, which are connected via an interface module to the communication computer and to the power supply distribution block. Each of the PWM modulators is by its output connected to the input of one of N×M voltage drivers relevant for such PWM modulator, where such voltage drivers are interconnected directly with the power distribution block. Output of each of N×M voltage drivers is then connected to electric input of one of N×M optical switching elements.

In one preferred embodiment, the optical module may also have a built-in temperature sensor located in the middle of the grid of interconnected optical switching elements and possibly also a thermoelectric temperature stabilizer may be placed adjacent to the sensor. Electronic module in this case contains a circuit for temperature measuring and possibly a circuit for temperature stabilization.

Optical module may be designed as integrated into a photonic integrated circuit. Likewise, the pulse-width modulators PWM may be implemented in one circuit, for instance in a gate array. In case when N×M is number higher than the number of the gate array output circuits, the voltage drivers are interconnected with the pulse-width modulators PWM by means of expanders.

Advantage of this arrangement of the modular kit of devices for variable distribution, mixing and monitoring of optical signals in Internet and other networks is that it allows both for traditional switching one input to one output, as well as for distribution of signals from one input to multiple outputs. It is possible to dynamically switch between these function modes. If the device operates in distribution mode, the ratio of the signal splitting among individual outputs may be dynamically changed. Moreover, the device can operate in signal mixing mode when inputs become the outputs and vice versa. Another possible mode is the optical signals monitoring where the measured signal travels from the input to the output and on the second output part of its power is separated and subsequently measured. Splitting ratio may be changed dynamically.

OVERVIEW OF FIGURES IN DRAWINGS

Principle of the invention is explained below and described with the help of the attached drawing, which shows a block diagram of the device. Attached drawing uses solid lines to indicate electric connections and dashed lines to indicate optical connections. Dash-and-dot lines indicate optional blocks.

In order to maintain clear orientation the drawing shows diagram of a device with two inputs and two outputs. At present, devices with eight inputs and eight outputs and also with sixteen inputs and sixteen outputs have been tested with success.

DETAILED DESCRIPTION OF THE PREFERRED EMBODIMENTS

Modular kit of devices for variable distribution, mixing and monitoring of optical signals in the Internet and other networks is formed by an optical module 1, control electronic module 2 and communication computer module 3. Optical module 1 has N, in this case two, optical inputs marked I, and M, in this case two, optical outputs marked O and contains four optical switching elements 110 to 113 2×2 MZI-type. Used optical switching elements 110 to 113 are optically interconnected in a grid with N rows and M columns. One optical input of optical switching elements 110, 111 of the first row and one optical output of optical switching elements 111, 113 of the last column remain unconnected. These optical switching elements 110 to 113 use transformation of electric signal to local warming, which influences the refraction index thus causing change of phase. Optical module 1 may also have a built-in temperature sensor 11 of the whole module, for instance a thermistor, located in the middle of the grid formed by optical switching elements 110 to 113. If temperature sensor 11 is used, a thermoelectric temperature regulator 12 may optionally also be implemented adjacent to the temperature sensor 11 to achieve better thermal stability. Advantageous embodiment is such where the complete optical module 1 is integrated into a photonic integrated circuit.

Control electronic module 2 contains N×M, in this case four, pulse-width modulators 210 to 213 where each of them is interconnected with one voltage driver 220 to 223. Outputs of voltage drivers 220 to 223 are connected to electric inputs of relevant optical switching elements 110 to 113. Control electronic module 2 may contain a temperature measuring circuit 21 for measuring the temperature of optical module 1, which is interconnected with the temperature sensor 11. Temperature measuring circuit 21 is interconnected with the temperature stabilization circuit 22, which is interconnected with thermoelectric temperature regulator 12. Control electronic module 2 further contains an interface module 23, which is interconnected with individual pulse-width modulators 210 to 213. Control electronic module 2 further contains power supply distribution block 24, which provides redundant power supply of the whole device. Power supply distribution block 24 is interconnected with pulse-width modulators 210 to 213, with voltage drivers 220 to 223, with interface module 23, with temperature measuring circuit 21, with temperature stabilization circuit 22 and with the first direct current power supply source module 25 and with the second direct current power supply source module 26.

Remote communication with the device plus other network functions is provided by the communication computer 3. Communication computer 3 is interconnected with the power supply distribution block 24 and with the interface module 23. Communication computer 3 is further interconnected with the user communication interface module 31 and the machine communication interface module 32 via wired and wireless interfaces, e.g. RS232, Ethernet, WI-FI, GPRS. Advantageously, the communication computer 3 has a single-board design, fanless processor and solid state disk, which increases mechanical resistance against vibrations.

Optical signal, or signals respectively, which should be distributed, is/are led to the inputs I of the optical module 1, it means always to the first optical switching element in a row of created grid structure, in this case to optical switching elements 110 and 112. Optical switching element 110 or 112, depending on to which of them the signal is led, allow transfer part of the optical signal power to the first column and through it subsequently to the first optical output. Remaining power is then further led in given row where its part can again be routed to another column and thus to another optical output, in this case by means of the optical switching element 111 and/or 113.

Optical switching elements 110 to 113 are electrically controlled, electric signal is converted by heat effect to a phase change and this change subsequently influences whether the signal further travels in a row or whether it is routed to a column. Electric control operates in the following manner: by means of the interface module 23 a number corresponding to the mark-to-space ratio 0-100% is written into each pulse-width modulator 210 to 213. Pulse-width modulator 210 to 213 then generates a signal with this mark-to-space ratio, which controls relevant voltage driver 220 to 223, which subsequently switches the electric input of given optical switching element 110 to 113.

If the electric temperature sensor 11 is fitted, then in interaction with the temperature measuring circuit 21 it measures temperature in the matrix of the optical switching elements 110 to 113.

If the thermoelectric temperature stabilizer 12 is fitted, then the temperature stabilization circuit 22 in interaction with the temperature measuring circuit 21 maintains the temperature of the optical switching elements 110 to 113 constant.

If the device is used for mixing, it operates in reverse direction. Signals to be mixed are led to the outputs O where their proportional parts can be selected and these are transferred to relevant row and there they exit at one or more inputs I.

In one advantageous embodiment the pulse-width modulators 210 to 213 are implemented in a gate array. If N×M is a high number, higher than the number of the gate array output circuits, expanders may be fitted to the gate array outputs and only to their outputs the voltage drivers 220 to 223 are connected.

INDUSTRIAL APPLICABILITY

This technical solution has very good industrial applicability, in particular for variable distribution, monitoring and mixing of high-speed optical signals, both in operational as well as in laboratory environments. As opposed to traditional solutions it offers minimum latencies and variable splitting/mixing ratios without the need for manual control.

The invention claimed is:

1. A modular set of devices for variable distribution, mixing and monitoring of optical signals of a network, comprising:
   an optical module, comprising:
      N optical inputs, where N is a non-zero natural number,
      M optical outputs, where M is a non-zero natural number,
      N×M optical switching elements,
         wherein the optical switching elements are 2×2 Mach-Zehnder interferometric switching elements and each optical switching element includes two switching element optical inputs, two switching element optical outputs and one switching element electric input, and
         wherein the N×M optical switching elements are arranged in a grid and each optical switching element is in communication with at least two other optical switching elements of the optical switching elements, and
      a temperature sensor, arranged centrally in the grid of the N×M optical switching elements;
   a control electronic module in communication with the optical module, comprising:
      N×M pulse-width modulators, each having a pulse-width modulator output,
      N×M voltage drivers, each having a voltage driver input and a voltage driver output, wherein
         the voltage driver input is connected to one of the pulse-width modulator outputs, and
         the voltage driver output is connected to one of the switching element electrical inputs,
      an interface module,
      a power supply distribution block connected to the N×M pulse-width modulators and the N×M voltage drivers, and
      a temperature measuring circuit connected to the temperature sensor of the optical module;
   a communication computer module in communication with the control electronic module, wherein the communication computer module is in communication with the N×M pulse width modulators via the interface module of the control electronic module;
   a user communication interface module in communication with the communication computer module;
   a machine communication interface module in communication with the communication computer module; and,
   at least one power supply source configured to supply power to the control electronic module.

2. The modular set of claim 1, wherein the optical module further comprises a thermoelectric regulator and the control electronic module further comprises a temperature stabilization circuit, and where the thermoelectric regulator and the temperature stabilization circuit are in communication.

3. The modular set of claim 1, wherein the optical module is integrated into a photonic integrated circuit.

4. The modular set of claim 1, wherein the pulse-width modulators are implemented in a single circuit in a gate array and where the gate array has a number of gate array outputs.

5. The modular set of claim 4, wherein N×M is a number higher than the number of gate array outputs.

6. The modular set of claim 5, wherein the gate array outputs have expanders and where the voltage driver inputs are connected to the pulse-width modulator outputs via the expanders.

7. The modular set of claim 1, wherein the network is part of the Internet.

* * * * *